US012007708B2

(12) United States Patent
Konishi

(10) Patent No.: US 12,007,708 B2
(45) Date of Patent: Jun. 11, 2024

(54) BELT DEVICE AND IMAGE FORMING APPARATUS INCORPORATING SAME

(71) Applicant: Takahiro Konishi, Tokyo (JP)

(72) Inventor: Takahiro Konishi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/196,446

(22) Filed: May 12, 2023

(65) Prior Publication Data

US 2023/0393494 A1 Dec. 7, 2023

(30) Foreign Application Priority Data

Jun. 7, 2022 (JP) ................................ 2022-092073

(51) Int. Cl.
*G03G 15/16* (2006.01)
*G03G 15/00* (2006.01)

(52) U.S. Cl.
CPC ..... *G03G 15/1615* (2013.01); *G03G 15/5054* (2013.01); *G03G 2215/1623* (2013.01)

(58) Field of Classification Search
CPC ....................... G03G 15/1615; G03G 15/5054
USPC ................................ 399/297, 302, 303, 308
See application file for complete search history.

(56) References Cited

U.S. PATENT DOCUMENTS

| | | | | |
|---|---|---|---|---|
| 2015/0050080 | A1 | 2/2015 | Morita et al. | |
| 2017/0010566 | A1 | 1/2017 | Kato et al. | |
| 2017/0168429 | A1 | 6/2017 | Imai et al. | |
| 2020/0064765 | A1 | 2/2020 | Suga et al. | |
| 2020/0133172 | A1 | 4/2020 | Konishi et al. | |
| 2020/0333731 | A1 * | 10/2020 | Murakami | G03G 15/1615 |
| 2023/0090307 | A1 | 3/2023 | Konishi | |

FOREIGN PATENT DOCUMENTS

| | | | |
|---|---|---|---|
| JP | 2011-180284 | | 9/2011 |
| JP | 2021-135375 | * | 9/2021 |

* cited by examiner

*Primary Examiner* — Hoan H Tran
(74) *Attorney, Agent, or Firm* — XSENSUS LLP

(57) ABSTRACT

A belt device includes a belt assembly, a pressing force adjuster, and an optical sensor. The belt assembly includes multiple rollers and a belt stretched by the multiple rollers and is rotatable about a rotation axis of one of the multiple rollers. The pressing force adjuster rotates the belt assembly about the rotation axis and adjusts a contact pressure of the belt pressed against an object. The optical sensor is disposed opposite to the one of the multiple rollers, and a position of the optical sensor relative to the rotation axis is fixed while the belt assembly is rotated by the pressing force adjuster.

8 Claims, 4 Drawing Sheets

BELT DEVICE AND IMAGE FORMING APPARATUS INCORPORATING SAME

CROSS-REFERENCE TO RELATED APPLICATION

This patent application is based on and claims priority pursuant to 35 U.S.C. § 119(a) to Japanese Patent Application No. 2022-092073, filed on Jun. 7, 2022, in the Japan Patent Office, the entire disclosure of which is hereby incorporated by reference herein.

BACKGROUND

Technical Field

Embodiments of the present disclosure generally relate to a belt device including a belt such as a secondary transfer belt, an intermediate transfer belt, and a transfer belt, and an image forming apparatus, such as a copier, a printer, a facsimile machine, or a multifunction peripheral (MFP) having at least two of such capabilities, incorporating the belt device.

Related Art

One type of image forming apparatus such as a copier, a printer, or the like includes an optical sensor (that is, a toner image detection sensor) to detect a toner image formed on a surface of a belt such as an intermediate transfer belt or a secondary transfer belt.

SUMMARY

This specification describes an improved belt device that includes a belt assembly, a pressing force adjuster, and an optical sensor. The belt assembly includes multiple rollers and a belt stretched by the multiple rollers. The belt assembly is rotatable about a rotation axis of one of the multiple rollers. The pressing force adjuster rotates the belt assembly about the rotation axis and adjusts a contact pressure of the belt pressed against an object. The optical sensor is disposed opposite to the one of the multiple rollers, and a position of the optical sensor relative to the rotation axis is fixed while the belt assembly is rotated by the pressing force adjuster.

This specification also describes an image forming apparatus including the belt device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
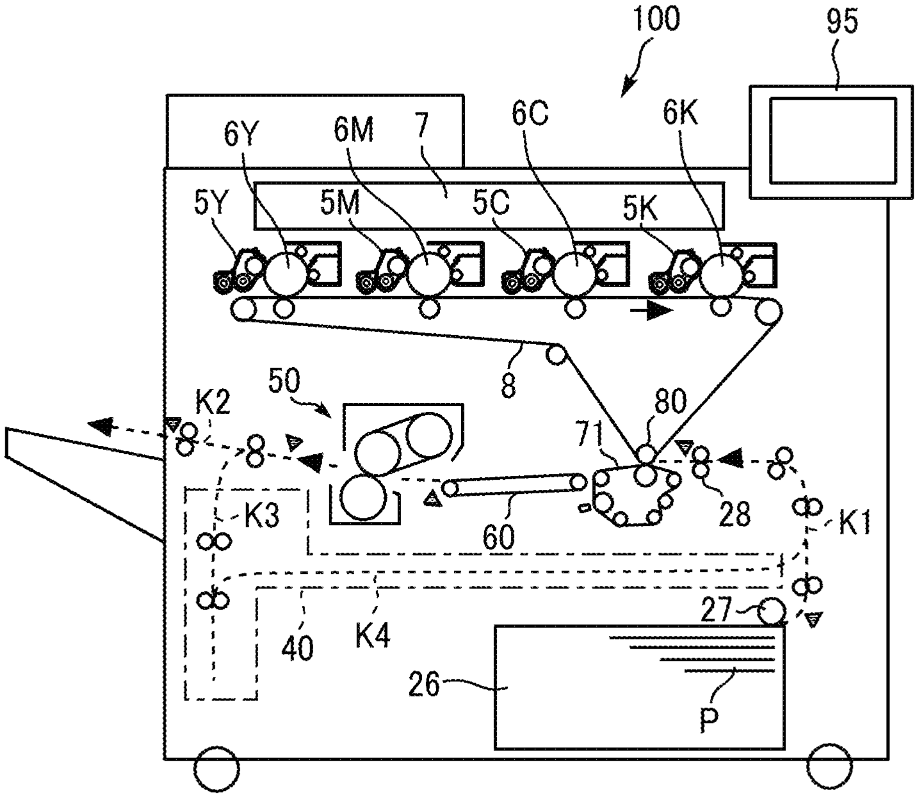
FIG. 1 is a schematic view of a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to the drawings, embodiments of the present disclosure are described below. Note that identical reference numerals are assigned to identical or equivalent components and a description of those components may be simplified or omitted.

Figure 2:
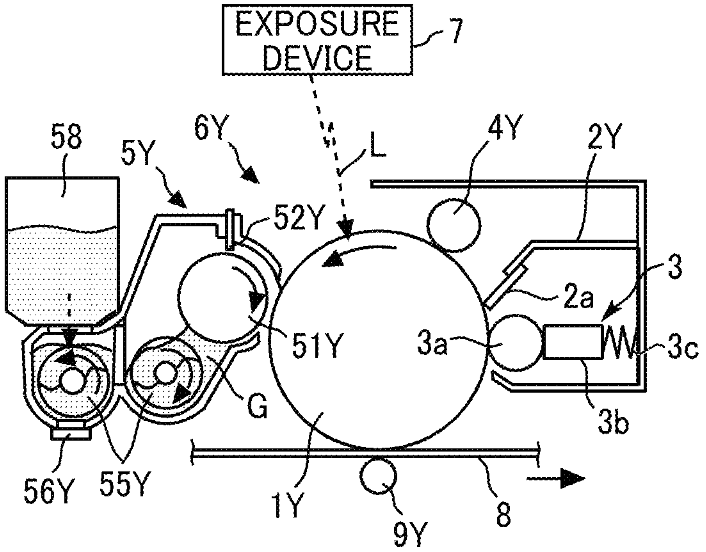
FIG. 2 is an enlarged view of a part of an image forming device and a block diagram that relates to the image forming device in the image forming apparatus of FIG. 1.

With reference to FIGS. 1 and 2, a configuration and operation of an image forming apparatus 100 is described below.

FIG. 1 is a schematic view of the configuration of the image forming apparatus 100, which in the present embodiment is a printer. FIG. 2 is an enlarged schematic view of a part of an image forming unit 6Y (an image forming device) of the image forming apparatus 100.

As illustrated in FIG. 1, the image forming apparatus 100 includes an intermediate transfer belt 8 as an image bearer and an intermediate transferor in a center of the image forming apparatus 100. The image forming units 6Y, 6M, 6C, and 6K, respectively corresponding to yellow, magenta, cyan, and black, are arranged in parallel, facing the intermediate transfer belt 8.

On an upper portion of the image forming apparatus 100, an operation display panel is disposed. The operation display panel displays information relating to printing operations (that is, image forming operations) and allows a user to perform operations relating to the printing operations.

Referring to FIG. 2, the image forming unit 6Y for yellow includes a photoconductor drum 1Y as a photoconductor and a charger 4Y, a developing device 5Y, a cleaning device 2Y, a lubricant supply device 3, a discharger, and the like disposed around the photoconductor drum 1Y. A series of image forming processes including charging, exposure, developing, primary transfer, cleaning, and electrical discharge processes is performed on the photoconductor drum 1Y. Accordingly, a yellow image is formed on the surface of the photoconductor drum 1Y.

The other three image forming units 6M, 6C, and 6K also have almost the same configuration as the image forming unit 6Y corresponding to yellow, except a configuration that the toner colors used are different. Thus, only the image forming unit 6Y is described below and descriptions of other image forming units 6M, 6C, and 6K are omitted.

Referring to FIG. 2, the photoconductor drum 1Y is rotated counterclockwise in FIG. 2 by a drive motor. The charger 4Y uniformly charges the surface of the photoconductor drum 1Y, which is referred to as the charging process.

The photoconductor drum 1Y is rotated further until reaching a position opposite to and facing an exposure device 7. The exposure device 7 irradiates the surface of the photoconductor drum 1Y with a laser beam L emitted from the exposure device 7 at this position and scans the surface of the photoconductor drum 1Y in a width direction (that is, a main scanning direction and a direction perpendicular to a plane on which FIGS. 1 and 2 is illustrated). By performing the above-described operation, the exposure device 7 forms an electrostatic latent image corresponding to the color of yellow on the surface of the photoconductor drum 1Y in the exposure process.

After the electrostatic latent image is formed on the surface of the photoconductor drum 1Y, the photoconductor drum 1Y is rotated further and reaches a position facing the developing device 5Y. At the position, the developing device 5Y develops the electrostatic latent image into a visible toner image of yellow in the developing process.

Thereafter, the surface of the photoconductor drum 1Y reaches a position opposite a primary transfer roller 9Y and the intermediate transfer belt 8, and the toner image formed on the photoconductor drum 1Y is transferred to a surface of the intermediate transfer belt 8 at this position in the primary transfer process. After the primary transfer process, a certain amount of residual toner that is not transferred to the intermediate transfer belt 8 remains on the photoconductor drum 1Y.

When the surface of the photoconductor drum 1Y reaches a position facing the cleaning device 2Y, a cleaning blade 2*a* collects the residual toner from the photoconductor drum 1Y into the cleaning device 2Y in the cleaning process.

The cleaning device 2Y includes a lubricant supply roller 3*a*, a solid lubricant 3*b*, and a compression spring 3*c* as a pressing member, which constitute a lubricant supply device 3 for the photoconductor drum 1Y. The lubricant supply roller 3*a* rotating clockwise in FIG. 2 scrapes a small amount of lubricant from the solid lubricant 3*b* and applies the lubricant to the surface of the photoconductor drum 1Y.

Subsequently, the surface of the photoconductor drum 1Y reaches a position opposite the discharger, and the discharger eliminates a residual potential from the photoconductor drum 1Y.

Thus, a series of image forming processes performed on the surface of the photoconductor drum 1Y is completed.

The above-described image forming processes are performed in the image forming units 6M, 6C, and 6K similarly to the image forming unit 6Y for yellow. That is, the exposure device 7 disposed above the image forming units 6M, 6C, and 6K irradiates the photoconductor drums 1M, 1C, and 1K of the image forming units 6M, 6C, and 6K with the laser beams L based on image data. Specifically, the exposure device 7 includes a light source to emit the laser beams L, multiple optical elements, and a polygon mirror that is rotated by a motor. The exposure device 7 scans, with the laser beams L, the photoconductor drums 1M, 1C, and 1K via the multiple optical elements while deflecting the laser beams L with the polygon mirror. Alternatively, an exposure device 7 in which a plurality of light-emitting diodes (LEDs) is arranged side by side in the width direction can be used.

Subsequently, developing devices 5M, 5C, and 5K develop electrostatic latent images into visible magenta, cyan, and black toner images, respectively, in the development process. The magenta, cyan, and black toner images respectively formed on the photoconductor drums 1M, 1C, and 1K are primarily transferred onto the intermediate transfer belt 8 such that the magenta, cyan, and black toner images are superimposed one atop another. Thus, a color toner image is formed on the intermediate transfer belt 8.

The intermediate transfer belt 8 is entrained around and supported by multiple rollers 16 to 22 and 80. As the drive motor drives and rotates a drive roller 16, the intermediate transfer belt 8 is rotated in a direction indicated by an arrow in FIG. 3.

Four primary transfer rollers 9Y, 9M, 9C, and 9K nip the intermediate transfer belt 8 together with the four photoconductor drums 1Y, 1M, 1C, and 1K to form the four primary transfer nips between the intermediate transfer belt 8 and the photoconductor drums 1Y, 1M, 1C, and 1K, respectively. A transfer voltage (i.e., a primary transfer bias) having a polarity opposite to a polarity of toner is applied to each of the primary transfer rollers 9Y, 9M, 9C, and 9K.

Figure 3:
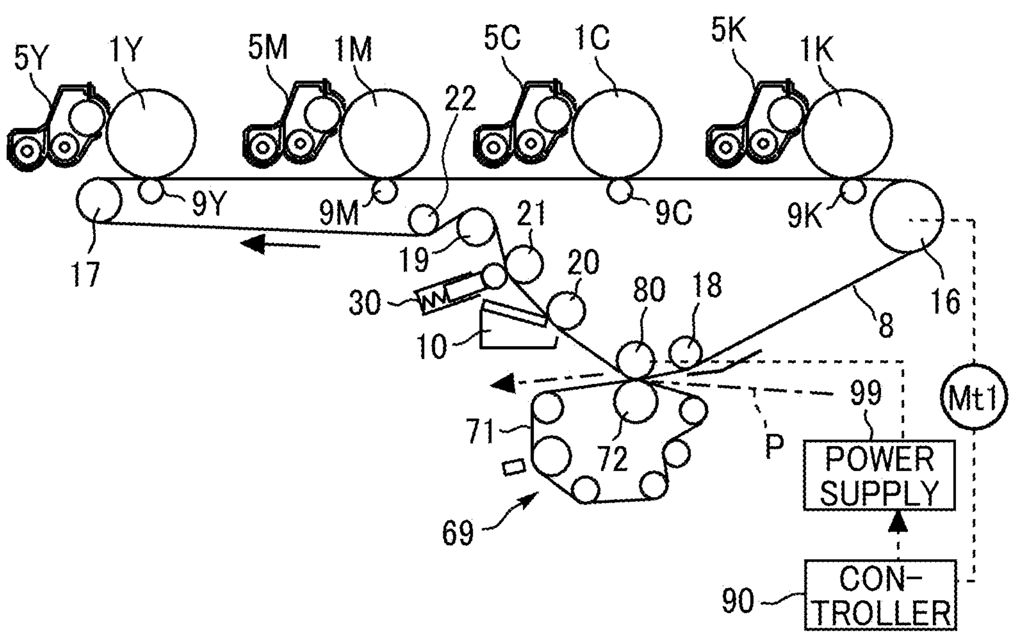
FIG. 3 is a schematic view of a configuration regarding an intermediate transfer belt and a secondary transfer belt device.

The intermediate transfer belt 8 travels in the direction indicated by the arrow in FIG. 3 and sequentially passes through the primary transfer nips formed by the four primary transfer rollers 9Y, 9M, 9C, and 9K. Thus, the toner images formed on the respective photoconductor drums 1Y 1M, 1C, and 1K are primarily transferred onto the intermediate transfer belt 8 in a manner of being superimposed one atop another to form a composite color toner image on the intermediate transfer belt 8 in the primary transfer process.

Subsequently, the intermediate transfer belt 8 bearing the composite color toner image reaches a position opposite a secondary transfer belt 71 as a transfer rotator. At this position, the intermediate transfer belt 8 and a secondary transfer belt 71 are sandwiched by the secondary transfer roller 72 and a secondary transfer backup roller 80 to form a secondary transfer nip. At the secondary transfer nip, the composite color toner image (that is, four-color toner image including yellow, magenta, cyan, and black colors) is secondarily transferred from the intermediate transfer belt 8 onto a sheet P serving as a recording medium conveyed to the position of the secondary transfer nip, in a secondary transfer process. At this time, residual toner that is not transferred onto the sheet P remains on the surface of the intermediate transfer belt 8.

After the secondary transfer process, the intermediate transfer belt 8 reaches a position opposite an intermediate transfer belt cleaner 10. At this position, the intermediate transfer belt cleaner 10 removes substances such as the residual toner adhering to the surface of the intermediate transfer belt 8.

Subsequently, the surface of the intermediate transfer belt 8 reaches a position facing a lubricant supply device 30 for the intermediate transfer belt 8. Lubricant is applied to the surface of the intermediate transfer belt 8 by the lubricant supply device 30 at the position.

Thus, a series of transfer processes performed on the surface of the intermediate transfer belt 8 is completed.

With reference to FIG. 1, the sheet P is conveyed from a sheet feeder 26 disposed in a lower portion of the apparatus body of the image forming apparatus 100 to the secondary transfer nip via a feed roller 27 and a registration roller pair 28.

Specifically, the sheet feeder 26 contains a stack of multiple sheets P such as sheets of paper stacked on one on another. The feed roller 27 is rotated counterclockwise in FIG. 1 to pick up and feed an uppermost sheet P of the multiple sheets P toward a portion between rollers of the registration roller pair 28 via a first sheet conveyance passage K1.

The registration roller pair 28 (a timing roller pair) temporarily stops rotating, stopping the sheet P with a leading edge of the sheet P nipped between the registration roller pair 28. Rotation of the registration roller pair 28 is timed to convey the sheet P toward the secondary transfer nip such that the sheet P meets the color toner image on the intermediate transfer belt 8 at the secondary transfer nip. Thus, the desired color toner image is transferred onto the sheet P.

The sheet P, onto which the color toner image is secondarily transferred at the secondary transfer nip, is conveyed on the secondary transfer belt 71 and separated from the secondary transfer belt 71, and then a conveyance belt 60 conveys the sheet P to a fixing device 50. In the fixing device 50, a fixing belt and a pressure roller apply heat and pressure to the sheet P to fix the color toner image on the sheet P, which is referred to as a fixing process.

The sheet P is conveyed through a second conveyance passage K2 and ejected by an ejection roller pair to the outside of the image forming apparatus 100. The sheets P ejected by the ejection roller pair to the outside of the image forming apparatus 100 are sequentially stacked as output images on a stack tray.

Thus, a series of image forming processes performed by the image forming apparatus 100 is completed.

In addition, the image forming apparatus 100 according to the present embodiment includes a duplex printing sheet conveyer 40 as illustrated in FIG. 1. The duplex printing sheet conveyer 40 conveys the sheet P toward the secondary transfer nip in order to transfer the color toner image on the intermediate transfer belt S to the back surface of the sheet P after the color toner image has been transferred to the front surface of the sheet P at the secondary transfer nip.

Specifically, in single-side printing mode, the sheet P is ejected after the toner image is fixed on the front side of the sheet P. By contrast, in duplex printing mode to form toner images on both sides (front side and back side) of the sheet P, the sheet P is guided to a third conveyance passage K3 in the duplex printing sheet conveyer 40. After a direction of conveyance of the sheet P is reversed, the sheet P is conveyed again to the secondary transfer nip (a secondary transfer belt device 69) via a fourth conveyance passage K4. Then, through the image forming processes (the printing operations) similar to those described above, the toner image is secondarily transferred onto the back side of the sheet P at the secondary transfer nip and fixed thereon by the fixing device 50. After the fixing process, the sheet P is ejected from the image forming apparatus 100 via the second conveyance passage K2.

Next, a detailed description is provided of a configuration and operations of the developing device 5Y in the image forming unit 6Y with reference to FIG. 2.

The developing device 5Y includes a developing roller 51Y facing the photoconductor drum 1Y, a doctor blade 52Y facing the developing roller 51Y, two conveying screws 55Y disposed in developer containers, and a toner concentration sensor 56Y to detect concentration of toner in a developer. The developing roller 51Y includes a stationary magnet, a sleeve that rotates around the magnet, and the like. The developer storage contains two-component developer G including carrier (carrier particles) and toner (toner particles).

The developing device 5Y configured as described above operates as follows.

The sleeve of the developing roller 51Y rotates in the direction indicated by an arrow in FIG. 2. The developer G held on the developing roller 51Y by the magnetic field generated by the magnet moves along the circumference of the developing roller 51Y as the sleeve rotates. A ratio of toner to the developer G (that is, a toner concentration) in the developing device 5Y is constantly adjusted within a predetermined range. Specifically, when low toner concentration is detected by the toner concentration sensor 56Y disposed in the developing device 5Y, fresh toner is supplied from a toner container 58 to the developing device 5Y to keep the toner concentration within the predetermined range.

The two conveying screws 55Y stir and mix the developer G with the toner supplied from the toner container 58 to the developer container while circulating the developer G in the two developer containers separated each other. In this case, the developer G moves in the direction perpendicular to the surface of the sheet on which FIG. 2 is drawn. The toner in developer G is charged by friction with carrier and electrostatically attracted to the carrier. Then, the toner is carried on the developing roller 51Y together with the carrier by a magnetic force generated on the developing roller 51Y.

The developer G borne on the developing roller 51Y is transported in the direction indicated by the arrow in FIG. 2 to the doctor blade 52Y. At this position, the doctor blade 52Y adjusts the amount of the developer G on the developing roller 51Y to an appropriate amount. Thereafter, the developer G on the developing roller 51Y is conveyed to a position opposite the photoconductor drum 1Y (i.e., a developing area). In the developing area, the toner is attracted to the latent image formed on the photoconductor drum 1Y by an electric field generated in the developing area. Thereafter, the developer G remaining on the developing roller 51Y is conveyed to an upper portion of the developer container along with rotation of the sleeve of the developing roller 51Y, where the developer G is separated from the developing roller 51Y.

The toner container 58 is detachably (that is, replaceably) attached to the developing device 5Y in the image forming apparatus 100. When the toner container 58 runs out of fresh toner, the toner container 58 is detached from the developing device 5Y (the image forming apparatus 100) and replaced with a new one.

Next, with reference to FIG. 3, a detailed description is provided of an intermediate transfer belt device according to the present embodiment.

With reference to FIG. 3, the intermediate transfer belt device includes the intermediate transfer belt 8 as an object and an image bearer, the four primary transfer rollers 9Y, 9M, 9C, and 9K, the drive roller 16, a driven roller 17, a pre-transfer roller 18, a tension roller 19, a cleaning backup roller 20, a lubricant backup roller 21, a backup roller 22, the intermediate transfer belt cleaner 10, the lubricant supply device 30 for the intermediate transfer belt 8, the secondary transfer backup roller 80, and the like.

The intermediate transfer belt 8 is in contact with four photoconductor drums 1Y, 1M, 1C, and 1K that bear toner images of respective colors to form primary transfer nips. The intermediate transfer belt 8 is stretched around and supported by eight rollers: the drive roller 16, the driven roller 17, the pre-transfer roller 18, the tension roller 19, the cleaning backup roller 20, the lubricant backup roller 21, the backup roller 22, and the secondary transfer backup roller 80.

According to the present embodiment, the intermediate transfer belt 8 is a single-layer or multi-layer belt formed with a material such as polyvinylidene fluoride (PVDF), ethylene tefrafluoroethylene (ETFE), polyimide (PI), and polycarbonate (PC), and a conductive material such as carbon black is dispersed therein. The volume resistivity of the intermediate transfer belt 8 is adjusted within a range of from $10^6$ to $10^{13}$ Ωcm, and the surface resistivity of the back surface of the intermediate transfer belt 8 is adjusted within a range of from $10^7$ to $10^{13}$Ω/sq. The thickness of the intermediate transfer belt 8 ranges from 20 to 200 μm. According to the present embodiment, the intermediate transfer belt 8 has a thickness of about 60 μm, and a volume resistivity of about $10^9$ Ωcm.

The intermediate transfer belt 8 may include a release layer coated on the surface of the intermediate transfer belt 8 as needed. Examples of a material usable for the release layer (coating) include, but are not limited to, fluoroplastic such as ETFE, polytetrafluoroethylene (PTFE), PVDF, perfluoroalkoxy polymer resin (PFA), fetrafluoroethylene-hexafluoropropylene copolymer (FEP), and polyvinyl fluoride (PVF).

The primary transfer rollers 9Y, 9M, 9C, and 9K are disposed in contact with the photoconductor drums 1Y, 1M, 1C, and 1K via the intermediate transfer belt 8, respectively. Specifically, the primary transfer roller 9Y for yellow is in contact with the photoconductor drum 1Y for yellow via the intermediate transfer belt 8. The primary transfer roller 9M for magenta is in contact with the photoconductor drum 1M for magenta via the intermediate transfer belt 8. The primary transfer roller 9C for cyan is in contact with the photoconductor drum 1C for cyan via the intermediate transfer belt 8. The primary transfer roller 9K for black is in contact with the photoconductor drum 1K for black via the intermediate transfer belt 8.

The drive roller 16 is disposed in contact with an inner circumferential surface of the intermediate transfer belt 8 by an angle of belt winding of about 120 degrees at a position downstream from the four photoconductor drums 1Y 1M, 1C, and 1K in a direction of rotation of the intermediate transfer belt 8. The drive roller 16 is rotated clockwise in FIG. 3 by the drive motor Mt1, which is controlled by a controller 90. With such a configuration, the intermediate transfer belt 8 rotates in a predetermined direction (i.e., clockwise in FIG. 3).

The driven roller 17 is disposed in contact with the inner circumferential surface of the intermediate transfer belt 8 by the angle of belt winding of about 180 degrees at a position upstream from the four photoconductor drums 1Y, 1M 1C, and 1K in the direction of rotation of the intermediate transfer belt 8. A portion of the intermediate transfer belt 8 extending from the driven roller 17 to the drive roller 16 via the four photoconductor drums 1Y, 1M, 1C, and 1K is substantially horizontal. The driven roller 17 is rotated clockwise in FIG. 3 as the intermediate transfer belt 8 rotates.

The tension roller 19 is in contact with an outer circumferential surface of the intermediate transfer belt 8. The pre-transfer roller 18, the cleaning backup roller 20, the lubricant backup roller 21, the backup roller 22, and the secondary transfer backup roller 80 are in contact with the inner circumferential surface of the intermediate transfer belt 8.

Between the secondary transfer backup roller 80 and the lubricant backup roller 21, the intermediate transfer belt cleaner 10 including a cleaning blade is disposed so that the cleaning blade is in contact with the intermediate transfer belt 8 supported by the cleaning backup roller 20.

Between the cleaning backup roller 20 and the tension roller 19, the lubricant supply device 30 for the intermediate transfer belt 8 is disposed so that the lubricant supply device 30 is in contact with the intermediate transfer belt 8 supported by the lubricant backup roller 21. Similar to the lubricant supply device 3 for the photoconductor drum, the lubricant supply device 30 includes a lubricant supply roller, a solid lubricant, and a compression spring as a pressing member for the intermediate transfer belt 8. The lubricant supply roller rotating counterclockwise in FIG. 3 rubs a small amount of lubricant from the solid lubricant and applies the lubricant to the surface of the intermediate transfer belt 8.

The plurality of rollers 17 through 22 and 80 other than the drive roller 16 is rotated clockwise in FIG. 3 by the intermediate transfer belt 8.

Figure 4:
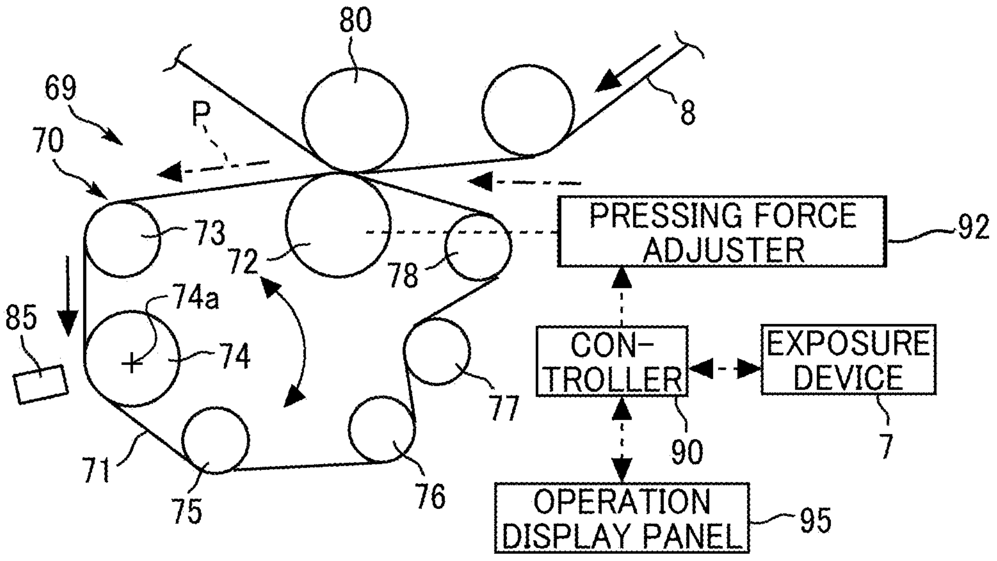
FIG. 4 is a schematic view of a configuration of the secondary transfer belt device and a block diagram that relates to the secondary transfer belt device.

With reference to FIG. 4, the secondary transfer backup roller 80 presses against the secondary transfer roller 72 in the secondary transfer belt device 69 via the intermediate transfer belt 8 and the secondary transfer belt 71. The secondary transfer backup roller 80 includes a cylindrical core made of, for example, stainless steel and the like and an elastic layer 83 on the outer circumferential face of the core. The elastic layer 83 is made of acrylonitrile-butadiene rubber (NBR). The elastic layer 83 has a volume resistivity ranging from approximately $10^7$ to $10^8$ Ωcm, and a hardness ranging from approximately 48 to 58 degrees on Japanese Industrial Standards A hardness (JIS-A hardness) scale. The elastic layer 83 has a thickness of approximately 5 mm.

According to the present embodiment, the secondary transfer backup roller 80 is electrically coupled to a power supply 99 as a bias output device. The power supply 99 outputs a high voltage of −5 kV as a secondary transfer bias. With the secondary transfer bias applied to the secondary transfer backup roller 80, the toner image primarily transferred to the surface of the intermediate transfer belt 8 is secondarily transferred onto the sheet P transported to the secondary transfer nip. The secondary transfer bias has the same polarity as the polarity of toner. In the present embodiment, the secondary transfer bias is a direct current voltage in a negative polarity. The secondary transfer bias forms a secondary transfer electric field that electrostatically moves the toner borne on the outer circumferential surface (a toner bearing surface) of the intermediate transfer belt 8 in a direction from the secondary transfer backup roller 80 toward a secondary transfer belt assembly 70.

The following describes the secondary transfer belt device 69 as a belt device with reference to FIG. 4.

As illustrated in FIG. 4, the secondary transfer belt device 69 is disposed so as to face the intermediate transfer belt 8 of the intermediate transfer belt device.

The secondary transfer belt device 69 includes the secondary transfer belt assembly 70 as a belt assembly, a pressing force adjuster 92, an optical sensor 85, and the like. The secondary transfer belt assembly 70 includes a secondary transfer belt 71 serving as a belt, the secondary transfer roller 72, a separation roller 73, a sensor facing roller 74, a first tension roller 75, a second tension roller 76, a third tension roller 77, and a fourth tension roller 78.

The secondary transfer belt 71 is an endless belt stretched around and supported by seven rollers (i.e., the secondary transfer roller 72, the separation roller 73, the sensor facing roller 74, the first to fourth tension rollers 75 to 78). The secondary transfer belt 71 is made of a material similar to that of the intermediate transfer belt 8. The secondary transfer belt 71 as the belt contacts the intermediate transfer belt 8 as the object to form the secondary transfer nip as a transfer nip and conveys the sheet P sent out from the secondary transfer nip.

The intermediate transfer belt 8 and the secondary transfer belt 71 are sandwiched by the secondary transfer roller 72 and the secondary transfer backup roller 80 to form the secondary transfer nip. The secondary transfer roller 72 includes a hollow tubular core made of, for example, stainless steel, aluminum, or the like and an elastic layer coated on the core. The elastic layer has a hardness ranging from approximately 40 to 50 degrees on Asker C hardness scale. The elastic layer of the secondary transfer roller 72 made of a rubber material, such as polyurethane, ethylene-propylene-diene monomer (EPDM), and silicone and has a solid or foam sponge state. A conductive filler, such as carbon, is dispersed in the rubber material. Alternatively, an ionic conductive material is included in the rubber material. According to the present embodiment, the elastic layer of the secondary transfer roller 72 has a volume resistivity ranging from $10^{6.5}$ to $10^{7.5}$ Ωcm to prevent concentration of a transfer current. In the present embodiment, the secondary transfer roller 72 is electrically grounded.

The controller 90 controls a secondary drive motor to rotate the secondary transfer roller 72 counterclockwise in FIG. 4. As a result, the secondary transfer belt 71 is rotated counterclockwise in FIGS. 3 and 4. The rotation of the secondary transfer belt 71 rotates the multiple rollers 73 to 78 in contact with the inner circumferential surface (or the outer circumferential surface) of the secondary transfer belt 71.

The separation roller 73 is disposed downstream from the secondary transfer nip in the direction of conveyance of the sheet P. Ejected from the secondary transfer nip, the sheet P is transported along the secondary transfer belt 71 rotating counterclockwise in FIG. 4 and separated from the secondary transfer belt 71 at a curved portion of the secondary transfer belt 71 wound around a circumference of the separation roller 73 by self-stripping.

The sensor facing roller 74 faces the optical sensor 85 via the secondary transfer belt 71, which will be described in detail later.

In the present embodiment, the secondary transfer belt 71 is stretched around and supported by the seven rollers 72 to 78, and the third tension roller 77 presses the outer circumferential surface of the secondary transfer belt 71. However, a number of rollers supporting the secondary transfer belt 71 stretched around the rollers, a number of rollers in contact with the outer circumferential surface of the secondary transfer belt 71, and positions of the rollers are not limited to those in the present embodiment.

Hereinafter, a characteristic configuration and operations of the secondary transfer belt device 69 as the belt device according to the present embodiment will be described in detail with reference to FIGS. 4 to 8.

As described above, the secondary transfer belt device 69 as the belt device in the present embodiment includes the secondary transfer belt assembly 70 as the belt assembly, the pressing force adjuster 92, the optical sensor 85, and the like.

As illustrated in FIG. 4, the secondary transfer belt assembly 70 as the belt assembly includes multiple rollers (that are seven rollers, i.e., the secondary transfer roller 72, the separation roller 73, the sensor facing roller 74, the first to fourth tension rollers 75 to 78) and the secondary transfer belt 71 as the belt stretched around by the multiple rollers 72 to 78.

The secondary transfer belt 71 serving as the belt is brought into pressure contact with the secondary transfer backup roller 80 via the intermediate transfer belt 8 serving as the object.

Figure 5A:
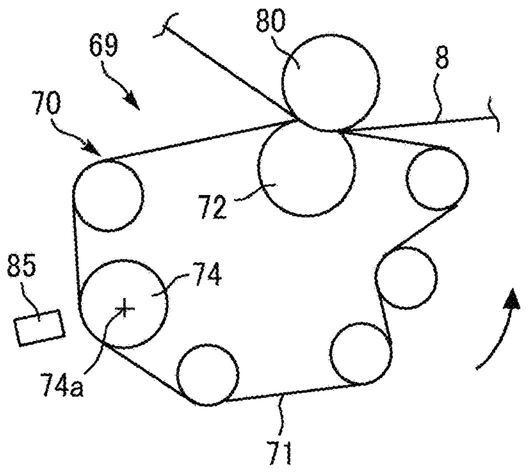
FIG. 5A is a schematic view of a secondary transfer belt assembly after the secondary transfer belt assembly is rotated to the intermediate transfer belt.
Figure 5B:
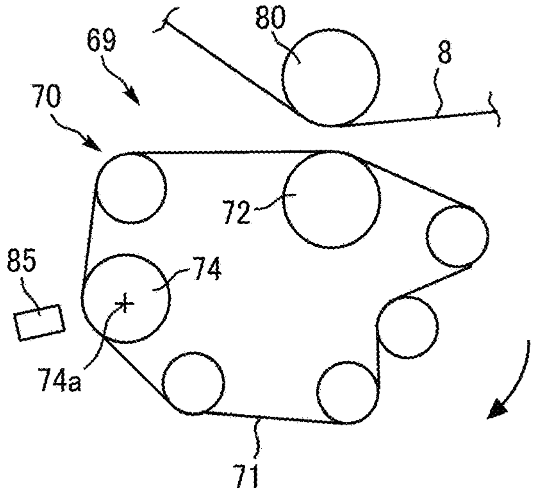
FIG. 5B is a schematic view of the secondary transfer belt assembly after the secondary transfer belt assembly is rotated away from the intermediate transfer belt.
Figure 6:
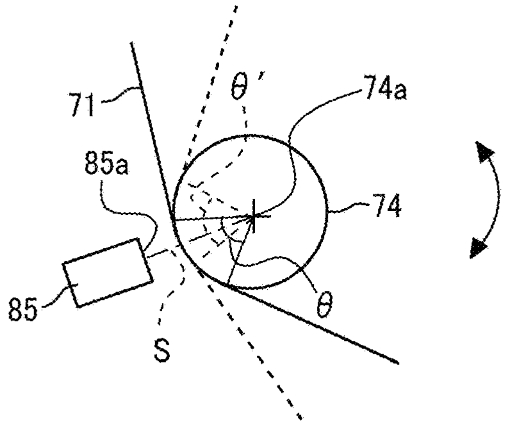
FIG. 6 is an enlarged view of an optical sensor and a sensor facing roller.

With reference to FIGS. 4 to 6, the secondary transfer belt assembly 70 is configured to be rotatable (in other words, swingable) about a rotation axis 74*a* of the sensor facing roller 74 that is one of the multiple rollers 72 to 78. The rotation axis is a rotation center of rotation of the sensor facing roller 74.

As described above, the secondary transfer roller 72 is pressed against the intermediate transfer belt 8 via the secondary transfer belt 71. The secondary transfer roller 72 is another of multiple rollers 72 to 78 and different from the sensor facing roller 74 that is the one of the multiple rollers 72 to 78.

The pressing force adjuster 92 rotates the secondary transfer belt assembly 70 as the belt assembly about the rotation axis 74*a* (that is the rotation axis of the sensor facing roller 74) to adjust a contact pressure of the secondary transfer belt 71 as the belt that is pressed against the intermediate transfer belt 8 as the object.

Figure 7:
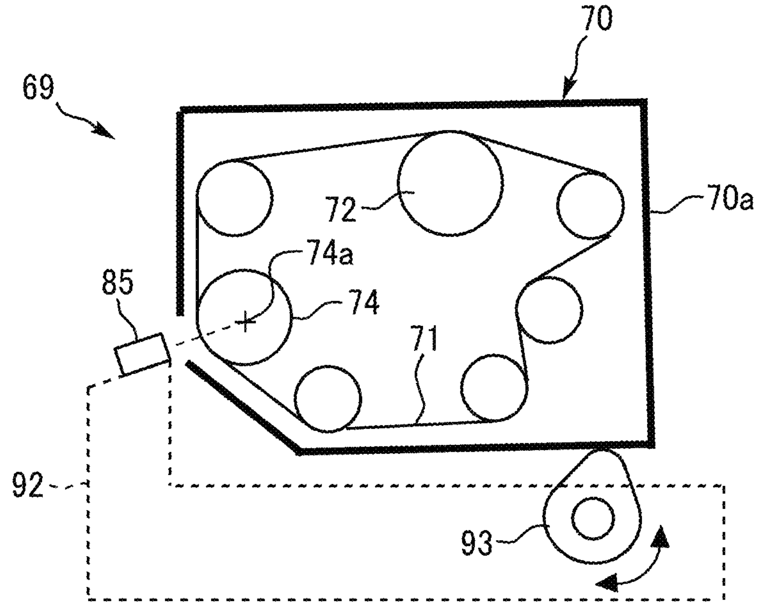
FIG. 7 is a schematic view of the secondary transfer belt assembly and a pressing force adjuster.

Specifically, with reference to FIG. 7, the pressing force adjuster 92 includes a cam 93 and a motor that drives and rotates the cam 93. The cam 93 comes into contact with the bottom of a unit case 70*a* of the secondary transfer belt assembly 70. Bearings are assembled to the unit case 70*a* and rotatably hold the seven rollers 72 to 78, and the secondary drive motor is fixed on the unit case 70*a* and drives and rotates the secondary transfer roller 72.

The controller 90 controls a motor rotating the cam 93 and sets a posture of the cam 93 to be a target posture (that is a posture in the rotation direction) to adjust the contact pressure (that is a nip pressure in the secondary transfer nip) of the secondary transfer belt 71 (and the secondary transfer roller) that is pressed against the intermediate transfer belt 8 (and the secondary transfer backup roller 80).

Specifically, as illustrated in FIG. 5A, the pressing force adjuster 92 rotates the secondary transfer belt assembly 70 counterclockwise about the rotation axis 74*a* to increase the nip pressure in the secondary transfer nip. In contrast, as illustrated in FIG. 5B, the pressing force adjuster 92 rotates the secondary transfer belt assembly 70 about the rotation axis 74*a* clockwise to decrease the nip pressure in the secondary transfer nip.

A state in which the nip pressure in the secondary transfer nip becomes small includes a state in which the secondary transfer belt 71 is completely separated from the intermediate transfer belt 8 as illustrated in FIG. 5B so that the nip pressure becomes 0.

More specifically, the controller 90 in the present embodiment controls the pressing force adjuster 92 so as to press a thick sheet P conveyed to the secondary transfer nip and passing through the secondary transfer nip at a smaller nip pressure than that of a thin sheet. As a result, regardless of the thickness of the sheet P, good conveying performance of the sheet P at the secondary transfer nip is ensured.

In addition, the controller 90 controls the pressing force adjuster 92 so that the pressing force adjuster 92 presses a sheet P, to which the toner image is not easily transferred, with a larger nip pressure in the secondary transfer nip than a sheet to which the toner image is easily transferred. As a result, regardless of the type of the sheet P, good transfer performance at the secondary transfer nip is ensured.

In addition, the controller 90 controls the pressing force adjuster 92 so that the nip pressure in the secondary transfer nip for the sheet P, to which the toner image having a small image area rate is secondarily transferred, is smaller than that for a sheet bearing the toner image having a large image area rate. The image area rate is a rate of the image area to an effective image area. The above-described control ensures stable transfer performance at the secondary transfer nip regardless of the image area rate.

Data relating to the thickness and the type of the sheet P is input to an operation display panel 95 by a user. The user operates the operation panel display to input the data. The controller 90 acquires the input data. The controller 90 acquires the image area rate based on the image data used by the exposure device 7.

The pressing force adjuster 92 in the present embodiment is configured to completely separate the secondary transfer belt 71 from the intermediate transfer belt 8 as illustrated in FIG. 5B.

When the image forming apparatus 100 does not perform the printing operations (in other words, the image forming processes), for example, after turning off the image forming apparatus, or after completing the printing operations, the controller 90 controls the pressing force adjuster 92 so as to completely separate the secondary transfer belt 71 from the intermediate transfer belt 8. If the intermediate transfer belt 8 and the secondary transfer belt 71 always come into pressure contact with each other, elastic distortion may occur. The above-described control can reduce a disadvantage as described above.

As illustrated in FIGS. 4 to 7, the optical sensor 85 in the present embodiment faces the sensor facing roller 74 as the one of the multiple rollers via the secondary transfer belt 71 as the belt. The sensor facing roller 74 as the one of the multiple rollers has the rotation center of rotation of the secondary transfer belt assembly 70 The optical sensor 85 is not interlocked with the rotation of the secondary transfer belt assembly 70 as the belt assembly that is rotated by the pressing force adjuster 92.

Specifically, the optical sensor 85 is a reflective photosensor including a light-emitting element and a light-receiving element that are disposed so as to face the outer circumferential surface of the secondary transfer belt 71 and is fixed to the pressing force adjuster 92 as illustrated in FIG. 7. That is, the optical sensor 85 is not fixed to the secondary transfer belt assembly 70 but is fixed to the pressing force adjuster 92 that does not move in conjunction with the rotation of the secondary transfer belt assembly 70.

In the present embodiment, the above-described image forming processes form an image pattern (that is, a toner image for image adjustment) on the intermediate transfer belt 8 at a timing different from the timing for printing the toner image on the sheet P such as a timing before printing or a timing between forming the images printed on the sheets. The image pattern is not transferred to the sheet P. The image pattern is secondarily transferred to the secondary transfer belt 71. The optical sensor 85 optically detects the image pattern (or background portion). Based on results detected by the optical sensor 85 as described above, the controller 90 adjusts various conditions regarding the secondary transfer process such as the secondary transfer bias, the nip pressure in the secondary transfer nip, and the rotation speed of the secondary transfer roller 72. As a result, the above-described control optimizes the transfer efficiency in the secondary transfer process (as a result, an image density is optimized) and reduces the displacement of the image secondarily transferred.

As described above, the optical sensor 85 in the present embodiment is disposed so as to face the roller (that is, the sensor facing roller 74) having the rotation axis 74*a* of the rotation of the secondary transfer belt assembly 70 and is fixed so as not to move in conjunction with the rotation of the secondary transfer belt assembly 70. The above-described structure is less likely vary detection accuracy of the optical sensor 85 that detects the image or the background portion on the surface of the secondary transfer belt 71 even when the secondary transfer belt 71 in the secondary transfer belt assembly 70 is rotated, and the size and cost of the secondary transfer belt device 69 are less likely to increase.

Figure 9A:
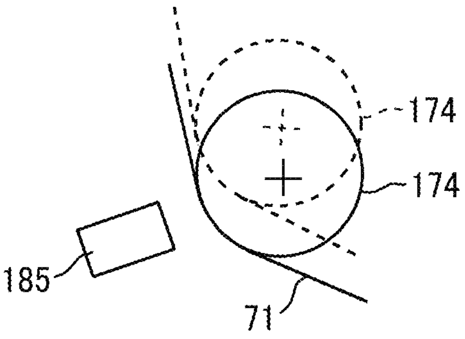
FIG. 9A is an enlarged view of an optical sensor and a sensor facing roller in a comparative embodiment.

Specifically, comparative embodiments are described with reference to FIGS. 9A and 9B. The comparative embodiment illustrated in FIG. 9A has a configuration in which the secondary transfer belt assembly is rotated about a rotation axis that is not the rotation axis of a sensor facing roller 174 (for example, the rotation axis of the first tension roller 75). Rotating the secondary transfer belt assembly in this configuration changes the posture of an optical sensor 185 fixed to the pressing force adjuster with respect to the secondary transfer belt 71 (and the sensor facing roller 174). As a result, the detection accuracy of the optical sensor 185 that detects the image pattern or the background portion on the surface of the secondary transfer belt 71 varies, which deteriorates the accuracy of control of the image density, the positional deviation, and the like based on the results detected by the optical sensor 185.

Figure 9B:
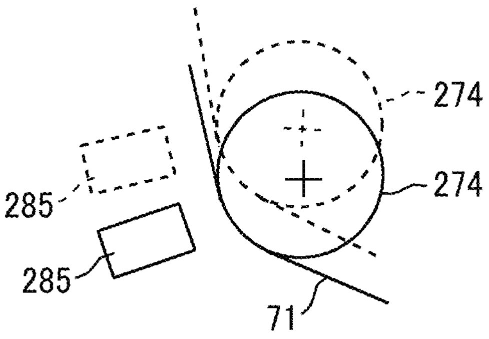
FIG. 9B is an enlarged view of the optical sensor and the sensor facing roller in another comparative embodiment.

The comparative embodiment illustrated in FIG. 9B has a configuration in which an optical sensor 285 is moved in conjunction with the rotation of the secondary transfer belt assembly so that the rotation of the secondary transfer belt assembly does not change the relative posture of the optical sensor 285 with respect to the secondary transfer belt 71 (and a sensor facing roller 274). This configuration needs a component holding and swinging the optical sensor 285 and a space for swinging the component, which increases the size and cost of the secondary transfer belt device.

In contrast, the optical sensor 85 in the present embodiment is disposed so as to face the sensor facing roller 74 having the rotation axis 74*a* that is the same as the rotation center of rotation of the secondary transfer belt assembly 70 and is fixed so as not to move in conjunction with the rotation of the secondary transfer belt assembly 70. As a result, the above-described disadvantage hardly occurs.

Referring to FIG. 6, the optical sensor 85 viewed in a cross section orthogonal to the rotation axis of the sensor facing roller 74 has a detection surface 85*a* orthogonal to a virtual normal line S passing through the rotation center 74*a* of the sensor facing roller 74 as the one of the multiple rollers.

That is, the optical sensor 85 is disposed such that the detection surface 85*a* (that is a light receiving surface) thereof faces the normal direction with respect to the sensor facing roller 74.

The above-described optical sensor 85 that detects the image pattern and the background portion on the surface of the secondary transfer belt 71 has higher detection accuracy than the optical sensor having the detection surface that is not orthogonal to the virtual normal line S and is inclined from the virtual normal line S.

When the pressing force adjuster 92 rotates the secondary transfer belt assembly 70 as the belt assembly, the rotation of the secondary transfer belt assembly 70 in the present embodiment changes a winding range θ of the secondary transfer belt 71 that winds around the sensor facing roller 74 as the one of the multiple rollers (that is, a range in which the belt is in contact with the sensor facing roller 74) as illustrated in FIG. 6.

Specifically, as illustrated in FIG. 6, rotating the secondary transfer belt assembly 70 from a position indicated by the solid line to a position indicated by the broken line displaces (in other words, rotates) the winding range of the secondary transfer belt 71 from the winding range θ indicated by the solid line to a winding range θ' indicated by the broken line about the rotation axis 74*a*.

The optical sensor 85 in the present embodiment faces the secondary transfer belt 71 having the winding ranges θ and θ' on the sensor facing roller 74 as the one of the multiple rollers even when the pressing force adjuster 92 rotates the secondary transfer belt assembly 70 and changes the winding range from θ to θ'. That is, even when the secondary transfer belt assembly 70 rotates, the optical sensor 85 always faces the rotation axis 74*a* of the sensor facing roller 74 via the secondary transfer belt 71 (and the winding range). In other words, the detection surface 85*a* is always orthogonal to the virtual normal line S. In other words, the optical sensor 85 is disposed opposite to the sensor facing roller 74 as the one of the multiple rollers, and a position of the optical sensor relative to the rotation axis is fixed while the belt assembly is rotated by the pressing force adjuster.

Thus, even when the secondary transfer belt assembly 70 is rotated, the detection accuracy of the optical sensor 85 that detects the image pattern and the background portion on the surface of the secondary transfer belt 71 is less likely to vary.

In particular, the pressing force adjuster 92 in the present embodiment rotates the secondary transfer belt assembly 70 as the belt unit within a predetermined rotation range.

That is, the pressing force adjuster 92 is not configured to be able to rotate the secondary transfer belt assembly 70 without limitation. The rotation range of the secondary transfer belt assembly 70 has an upper limit and a lower limit. Specifically, to limit the rotation range of the secondary transfer belt assembly 70 within a predetermined range, the shape of the cam 93 is designed, or the pressing tierce adjuster 92 may include a stopper coming into contact with the secondary transfer belt assembly 70 when the rotation range reaches to the upper limit or the lower limit.

As a result, the optical sensor 85 always faces the secondary transfer belt 71 with the winding range θ on the sensor facing roller 74 even when the secondary transfer belt assembly 70 rotates in the predetermined rotation range.

Thus, even when the secondary transfer belt assembly 70 is rotated, the detection accuracy of the optical sensor 85 that detects the image pattern and the background portion on the surface of the secondary transfer belt 71 is less likely to vary.

Figure 8:
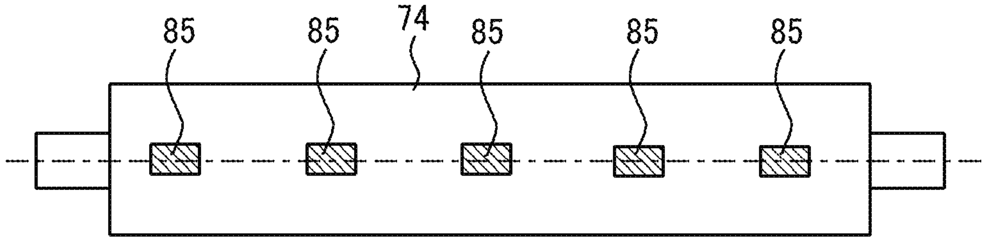
FIG. 8 is a schematic view of the sensor facing roller and multiple optical sensors arranged in an axial direction of the sensor facing roller.

As illustrated in FIG. 8, in the present embodiment, multiple optical sensors 85 may be arranged at intervals along the axial direction of the sensor facing roller 74 that is defined by the rotation axis 74*a*. The axial direction is the lateral direction in FIG. 8.

The above-described configuration enables the multiple optical sensors 85 to detect image patterns (or background portions) formed on the secondary transfer belt 71 and arranged along the axial direction of the sensor facing roller 74 at the time of adjusting the various conditions for the secondary transfer process described above. Based on the results detected by the multiple optical sensors 85, the controller 90 can accurately adjust various conditions for the secondary transfer process over the axial direction.

As described above, the secondary transfer belt device 69 according to the present embodiment includes the multiple rollers 72 to 78, the secondary transfer belt 71 as the belt stretched over the multiple rollers 72 to 78, and the secondary transfer belt assembly 70 as the belt assembly configured to be rotatable about the rotation axis 74*a* of the sensor facing roller 74 that is one of the multiple rollers 72 to 78. In addition, the secondary transfer belt device 69 includes the pressing force adjuster 92 and the optical sensor 85. The pressing force adjuster 92 rotates the secondary transfer belt assembly 70 about the rotation axis 74*a*, which enables adjustment of the contact pressure of the secondary transfer belt 71 pressed against the intermediate transfer belt 8 as the object. The optical sensor 85 faces the sensor facing roller 74 via the secondary transfer belt 71 without being interlocked with the rotation of the secondary transfer belt assembly 70 that is rotated by the pressing force adjuster 92.

Thus, even when the secondary transfer belt 71 is rotated (that is, even when the secondary transfer belt assembly 70 is rotated), the detection accuracy of the optical sensor 85 that detects the image pattern and the background portion on the surface of the secondary transfer belt 71 is less likely to vary.

The image forming apparatus 100 in the present embodiment employs a repulsive force transfer method and includes the power supply 99 that applies the secondary transfer bias to the secondary transfer backup roller 80. The present disclosure may be applied to an image forming apparatus employing an attractive force transfer method in which a power supply applies a secondary transfer bias to the secondary transfer roller 72.

In this case, the secondary transfer bias has a polarity opposite to that of the repulsive force transfer method. Further, the present disclosure may also be applied to an image forming apparatus in which the repulsive force transfer method and the attraction transfer method are used in combination.

In the present embodiment, the present disclosure is applied to the secondary transfer belt device 69 using the secondary transfer belt 71 as the belt. However, the present disclosure is not limited to this. The present disclosure may be applied to a belt device using the intermediate transfer belt 8 or a transfer belt as the belt.

Further, in the above-described embodiments, the present disclosure is applied to the image forming apparatus 100 that forms the color image. Alternatively, the present disclosure may also be applied to an image forming apparatus that forms a monochrome image alone.

Even in such a case, an advantageous effect equivalent to that of the present embodiment can be obtained.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. The number, position, and shape of the components described above are not limited to those embodiments described above. Desirable number, position, and shape can be determined to perform the present disclosure.

Aspects of the present disclosure are, for example, as follows.

First Aspect

In a first aspect, a belt device includes a belt assembly, a pressing force adjuster, and an optical sensor. The belt assembly includes multiple rollers and a belt stretched by the multiple rollers. The belt assembly is rotatable about a rotation axis of one of the multiple rollers. The pressing force adjuster rotates the belt assembly about the rotation axis and adjusts a contact pressure of the belt pressed against an object. The optical sensor is disposed opposite to the one of the multiple rollers, and a position of the optical sensor relative to the rotation axis is fixed while the belt assembly is rotated by the pressing force adjuster.

Second Aspect

In a second aspect, the optical sensor in the belt device according to the first aspect has a detection surface orthogonal to a virtual normal line passing through the rotation axis of the one of the multiple rollers in a cross section orthogonal to an rotation axis of the one of the multiple rollers.

Third Aspect

In a third aspect, a winding range of the belt wound around the one of the multiple rollers is changed by the rotation of the belt assembly in the belt device according to the first aspect or the second aspect. The optical sensor is disposed opposite to the one of the multiple rollers within the winding range while the winding range changes according to the rotation of the belt assembly.

Fourth Aspect

In a fourth aspect, the pressing force adjuster in the belt device according to the third aspect is configured to rotate the belt assembly in a predetermined rotation range.

Fifth Aspect

In a fifth aspect, the optical sensor in the belt device according to any one of the first to fourth aspects is fixed to the pressing force adjuster.

Sixth Aspect

In a sixth aspect, the belt device according to any one of the first to fifth aspects further includes multiple optical sensors including the optical sensor, and the multiple optical sensors are arranged at intervals along the rotation axis of the one of the multiple rollers.

Seventh Aspect

In a seventh aspect, the belt device according to any one of the first to sixth aspect includes the belt that is a secondary transfer belt pressed against a secondary transfer backup roller via an intermediate transfer belt as the object, the multiple rollers including a secondary transfer roller different from the one of the multiple rollers, and the optical sensor that is a reflective optical sensor. In addition, the secondary transfer roller is pressed against the intermediate transfer belt via the secondary transfer belt.

Eighth Aspect

In an eighth aspect, an image forming apparatus includes the belt device according to any one of the first to seventh aspects.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A belt device comprising:
a belt assembly including:
multiple rollers; and
a belt stretched by the multiple rollers,
the belt assembly configured to be rotatable about a rotation axis of one of the multiple rollers;
a pressing force adjuster configured to:
rotate the belt assembly about the rotation axis; and
adjust a contact pressure of the belt against an object; and
an optical sensor disposed opposite to the one of the multiple rollers,
wherein a position of the optical sensor relative to the rotation axis is fixed while the belt assembly is rotated by the pressing force adjuster.

2. The belt device according to claim 1,
wherein the optical sensor has a detection surface orthogonal to a virtual normal line passing through the rotation axis in a cross section orthogonal to the rotation axis of the one of the multiple rollers.

3. The belt device according to claim 1,
wherein a winding range of the belt wound around the one of the multiple rollers is changed by the rotation of the belt assembly, and
the optical sensor is disposed opposite to the one of the multiple rollers within the winding range while the winding range changes according to the rotation of the belt assembly.

4. The belt device according to claim 3,
wherein the pressing force adjuster is configured to rotate the belt assembly in a predetermined rotation range.

5. The belt device according to claim 1,
wherein the optical sensor is fixed to the pressing force adjuster.

6. The belt device according to claim 1, further comprising
multiple optical sensors including the optical sensor, the multiple optical sensors arranged at intervals along the rotation axis of the one of the multiple rollers.

7. The belt device according to claim 1,
wherein the belt is a secondary transfer belt pressed against a secondary transfer backup roller via an intermediate transfer belt as the object,
the multiple rollers includes a secondary transfer roller different from the one of the multiple rollers, and
the secondary transfer roller is pressed against the intermediate transfer belt via the secondary transfer belt, and
the optical sensor is a reflective optical sensor.

8. An image forming apparatus comprising the belt device according to claim 1.

* * * * *